US012521302B1

(12) United States Patent
Zheng

(10) Patent No.: US 12,521,302 B1
(45) Date of Patent: Jan. 13, 2026

(54) THERAPEUTIC APPARATUS

(71) Applicant: Huiwei Zheng, Guangdong (CN)

(72) Inventor: Huiwei Zheng, Guangdong (CN)

( * ) Notice: Subject to any disclaimer, the term of this patent is extended or adjusted under 35 U.S.C. 154(b) by 0 days.

(21) Appl. No.: 19/027,740

(22) Filed: Jan. 17, 2025

(30) Foreign Application Priority Data

Dec. 25, 2024 (CN) ......................... 202423217750.2

(51) Int. Cl.
*A61H 15/00* (2006.01)
*A61H 15/02* (2006.01)

(52) U.S. Cl.
CPC ......... *A61H 15/0092* (2013.01); *A61H 15/02* (2013.01); *A61H 2015/0042* (2013.01); *A61H 2201/0153* (2013.01); *A61H 2201/0157* (2013.01); *A61H 2201/10* (2013.01)

(58) Field of Classification Search
CPC ........ A61H 7/003; A61H 7/004; A61H 7/005; A61H 15/00; A61H 15/0092; A61H 15/0085; A61H 15/02; A61H 2015/0007; A61H 2015/0042; A61H 2015/0057; A61H 2201/0153; A61H 2201/0157; A61B 17/122; A61B 17/1227; A61B 17/0487; A61F 6/206; B25B 5/05; B25B 5/14; B25B 7/06; B25B 7/08; B25B 9/00; B25B 9/02; B25F 1/003
See application file for complete search history.

(56) References Cited

U.S. PATENT DOCUMENTS

| | | | | |
|---|---|---|---|---|
| 8,961,442 | B2 * | 2/2015 | Galvez Campos | A61H 15/0092 601/127 |
| 2007/0083135 | A1 * | 4/2007 | Gueret | A61H 15/02 601/123 |
| 2015/0272814 | A1 * | 10/2015 | Chen | A61H 15/0085 601/97 |
| 2019/0387712 | A1 * | 12/2019 | Hayashi | A61H 15/0092 |
| 2020/0246214 | A1 * | 8/2020 | Nelson | A61H 15/00 |
| 2020/0390642 | A1 * | 12/2020 | Kim | A61N 1/0456 |
| 2021/0145689 | A1 * | 5/2021 | Cheong | A61H 15/0085 |
| 2022/0354732 | A1 * | 11/2022 | Levi | A61N 5/0625 |

* cited by examiner

*Primary Examiner* — Colin W Stuart
*Assistant Examiner* — Douglas Y Sul
(74) *Attorney, Agent, or Firm* — HOWARD M COHN and Associates, LLC

(57) ABSTRACT

A therapeutic apparatus is disclosed. The therapeutic apparatus includes a handheld member, a first therapeutic arm, and a second therapeutic arm. The first therapeutic arm and the second therapeutic arm are arranged on the handheld member and positioned facing each other. The first therapeutic arm and the second therapeutic arm are capable of elastically opening relative to each other and elastically clamping a therapeutic portion of a user for a therapy. In this way, structure of the therapeutic apparatus is simple, and operation and use are flexible and convenient. Moreover, since the therapeutic apparatus includes the first therapeutic arm and the second therapeutic arm, the first therapeutic arm and the second therapeutic arm can simultaneously provide therapeutic operations, thus effectively improving therapeutic efficiency and therapeutic effect.

18 Claims, 12 Drawing Sheets

THERAPEUTIC APPARATUS

FIELD

The present disclosure relates to the field of therapeutic products, and particularly relates to a therapeutic apparatus.

BACKGROUND

With improvement of living standards, people often use therapeutic apparatus for daily health care. A therapeutic apparatus is mainly an instrument that applies physical factors to human body to make the human body improve, and is suitable for places such as homes and offices. Common physical factors include electricity, light, pressure, radio frequency, etc. Therefore, there can be multiple therapeutic methods, for example, massaging face with a therapeutic apparatus to achieve a therapeutic effect of beauty and face slimming; massaging muscles, joints, and other portions with a pressure therapeutic apparatus to achieve a therapeutic effect of muscle and joint relaxation; acting on muscles, joints, skin, and other portions with radio frequency electromagnetic wave of the therapeutic apparatus to achieve a therapeutic effect of relaxation and skin care; acting on muscles, joints, skin, and other portions with the electrical stimulation of the therapeutic apparatus to achieve a therapeutic effect of relaxation and skin care; irradiating the therapeutic portion with infrared rays to achieve a therapeutic effect of promoting blood circulation and relieving nerves. In related art, the therapeutic apparatus has a therapeutic component, which acts on a therapeutic portion of the human body to achieve the therapeutic effect. However, since the therapeutic component is generally fixed, it is not convenient for user's therapeutic operation.

SUMMARY

In order to overcome the deficiencies of the related art, the present disclosure provides a therapeutic apparatus.

The technical solutions adopted by the present disclosure to solve the technical problems are as follows.

The present disclosure provides a therapeutic apparatus. The therapeutic apparatus includes a handheld member, a first therapeutic arm, and a second therapeutic arm. The first therapeutic arm and the second therapeutic arm are arranged on the handheld member and positioned facing each other. The first therapeutic arm and the second therapeutic arm are capable of elastically opening relative to each other. The first therapeutic arm and the second therapeutic arm are capable of elastically clamping a therapeutic portion of a user for a therapy.

In some embodiments, the therapeutic apparatus further includes a torsion spring assembly. The torsion spring assembly is configured to enable the first therapeutic arm and the second therapeutic arm to open relative to each other elastically.

In some embodiments, the torsion spring assembly includes a first torsion spring and a second torsion spring. The first torsion spring is configured to enable the first therapeutic arm to open relative to the second therapeutic arm elastically. The second torsion spring is configured to enable the second therapeutic arm to open relative to the first therapeutic arm elastically.

In some embodiments, the handheld member has a first side and a second side. One end of the first therapeutic arm is rotatably connected to the first side of the handheld member. One end of the first torsion spring abuts against the first side of the handheld member. The other end of the first torsion spring abuts against the one end of the first therapeutic arm. One end of the second therapeutic arm is rotatably connected to the second side of the handheld member. One end of the second torsion spring abuts against the second side of the handheld member. The other end of the second torsion spring abuts against the one end of the second therapeutic arm.

In some embodiments, the first side of the handheld member is arranged with a first central shaft. The first torsion spring has a first central portion. The first central portion sleeves the first central shaft. The one end of the first therapeutic arm defines a first shaft hole. The one end of the first therapeutic arm sleeves the first central portion via the first shaft hole. The one end of the first therapeutic arm is rotatably connected to the first side of the handheld member.

In some embodiments, the first central shaft includes a first mounting portion and two first shaft portions. The first mounting portion is located in the middle of the first central shaft. Each of the two first shaft portions is arranged on a respective one side of two sides of the first mounting portion. The first mounting portion is connected to the first side of the handheld member. The first central portion of the first torsion spring has two first sleeve portions. Each of the two first sleeve portions sleeves a respective one of the two first shaft portions. The one end of the first therapeutic arm sleeves the two first sleeve portions via the first shaft hole.

In some embodiments, the two first sleeve portions have two first abutting feet extending towards the first side of the handheld member. Each of the two first sleeve portions has a respective one of the two first abutting feet. The two first abutting feet cooperatively form the one end of the first torsion spring. The two first sleeve portions have two second abutting feet extending towards the one end of the first therapeutic arm. Each of two first sleeve portions has a respective one of the two second abutting feet. The two second abutting feet are connected to each other and cooperatively form the other end of the first torsion spring.

In some embodiments, the first therapeutic arm includes a first housing and a second housing. The first housing is arranged with two first half hole units. The second housing is arranged with two second half hole units. When the first housing and the second housing are spliced together, the two first half hole units and the two second half hole units cooperatively define the first shaft hole, and each of the two first half hole units corresponds a respective one of the two second half hole units.

In some embodiments, the second side of the handheld member is arranged with a second central shaft. The second torsion spring has a second central portion. The second central portion sleeves the second central shaft. The one end of the second therapeutic arm defines a second shaft hole. The one end of the second therapeutic arm sleeves the second central portion via the second shaft hole. The one end of the second therapeutic arm is rotatably connected to the second side of the handheld member.

In some embodiments, the second central shaft includes a second mounting portion and two second shaft portions. The second mounting portion is located in the middle of the second central shaft. Each of the two second shaft portions is arranged on a respective one side of two sides of the second mounting portion. The second mounting portion is connected to the second side of the handheld member. The second central portion of the second torsion spring has two second sleeve portions. Each of the two second sleeve portions sleeves a respective one of the two second shaft portions. The one end of the second therapeutic arm sleeves the two second sleeve portions via the second shaft hole.

In some embodiments, the two second sleeve portions have two third abutting feet extending towards the second side of the handheld member. Each of the two second sleeve portions has a respective one of the two third abutting feet. The two third abutting feet cooperatively form the one end of the second torsion spring. The two second sleeve portions have two fourth abutting feet extending towards the one end of the second therapeutic arm. The two fourth abutting feet are connected with each other and cooperatively form the other end of the second torsion spring.

In some embodiments, the second therapeutic arm includes a third housing and a fourth housing. The third housing is arranged with two third half hole units. The fourth housing is arranged with two fourth half hole units. When the third housing and the fourth housing are spliced together, the two third half hole units and the two fourth half hole units cooperatively define the second shaft hole, and each of the two third half hole units corresponds to a respective one of the two fourth half hole units.

In some embodiments, the first therapeutic arm is arranged with a first stop portion. The first stop portion is arranged facing the second therapeutic arm. The second therapeutic arm is arranged with a second stop portion. The second stop portion is arranged facing the first therapeutic arm. When the first therapeutic arm and the second therapeutic arm are elastically reset, the first stop portion and the second stop portion abut against each other.

In some embodiments, the therapeutic apparatus further includes a linkage mechanism. The linkage mechanism is configured to enable the first therapeutic arm and the second therapeutic arm to elastically open synchronously.

In some embodiments, the linkage mechanism includes a first gear and a second gear. The first gear is arranged at the one end of the first therapeutic arm. The first gear is coaxially arranged with a rotation center of the first therapeutic arm. The first gear is arranged facing the second therapeutic arm. The second gear is arranged at the one end of the second therapeutic arm. The second gear is coaxially arranged with a rotation center of the second therapeutic arm. The second gear is arranged facing the first therapeutic arm. The first gear and the second gear are meshed with each other.

In some embodiments, the other end of the first therapeutic arm is arranged with a first therapeutic component. The other end of the second therapeutic arm is arranged with a second therapeutic component. When the first therapeutic arm and the second therapeutic arm elastically open relative to each other, the first therapeutic component and the second therapeutic component are capable of clamping the therapeutic portion of the user.

In some embodiments, each of the first therapeutic component and the second therapeutic component includes at least a pressure therapeutic component, a light therapeutic component, an electrical stimulation therapeutic component, and a radio frequency therapeutic component.

The present disclosure further provides another therapeutic apparatus. The therapeutic apparatus includes a handheld member, a first therapeutic arm, and a second therapeutic arm. The first therapeutic arm and the second therapeutic arm are arranged on the handheld member and positioned facing each other. The first therapeutic arm and the second therapeutic arm are capable of opening relative to each other elastically. The first therapeutic arm and the second therapeutic arm are capable of elastically clamping a therapeutic portion of a user for a therapy. The therapeutic apparatus further includes a linkage mechanism. The linkage mechanism is configured to enable the first therapeutic arm and the second therapeutic arm to elastically open synchronously.

In some embodiments, the handheld member has a first side and a second side. One end of the first therapeutic arm is rotatably connected to the first side of the handheld member. The other end of the first therapeutic arm is arranged with a first therapeutic component. One end of the second therapeutic arm is rotatably connected to the second side of the handheld member. The other end of the second therapeutic arm is arranged with a second therapeutic component.

In some embodiments, the linkage mechanism includes a first gear and a second gear. The first gear is arranged at the one end of the first therapeutic arm. The first gear is coaxially arranged with a rotation center of the first therapeutic arm. The first gear is arranged facing the second therapeutic arm. The second gear is arranged at the one end of the second therapeutic arm. The second gear is coaxially arranged with a rotation center of the second therapeutic arm. The second gear is arranged facing the first therapeutic arm. The first gear and the second gear are meshed with each other.

The beneficial effects of the present disclosure are as follows. Since the first therapeutic arm and the second therapeutic arm can elastically open relative to each other and have a certain degree of mobility, the first therapeutic arm and the second therapeutic arm can elastically clamp the therapeutic portion of the user for the therapy. Specifically, the first therapeutic arm and the second therapeutic arm can clamp the therapeutic portion such as the user's face, legs, hands, etc. Structure of the therapeutic apparatus is simple, and operation and use are flexible and convenient. Moreover, since the therapeutic apparatus includes the first therapeutic arm and the second therapeutic arm, the first therapeutic arm and the second therapeutic arm can simultaneously provide therapeutic operations, effectively improving therapeutic efficiency and therapeutic effect.

BRIEF DESCRIPTION OF THE DRAWINGS

In order to explain more clearly the technical solutions in the embodiments of the present disclosure, the following will briefly introduce the drawings required for use in the description of the embodiments. The drawings in the following description are only some embodiments of the present disclosure. For those of ordinary skill in the art, without creative work, other drawings can also be obtained according to these drawings.

The following further illustrates the present disclosure in combination with the drawings and embodiments.

DETAILED DESCRIPTION

Figure 1:
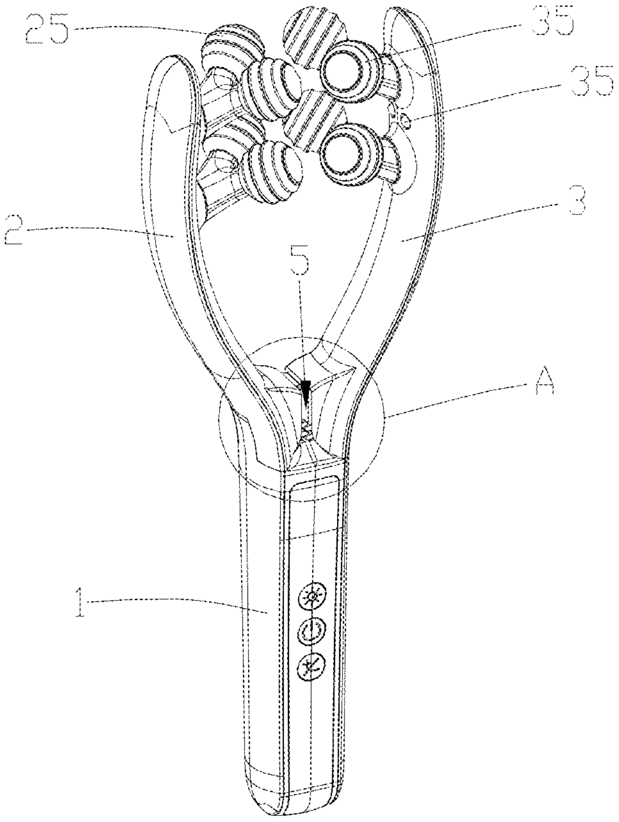
FIG. 1 is a structural view of a therapeutic apparatus according to some embodiments of the present disclosure.
Figure 2:
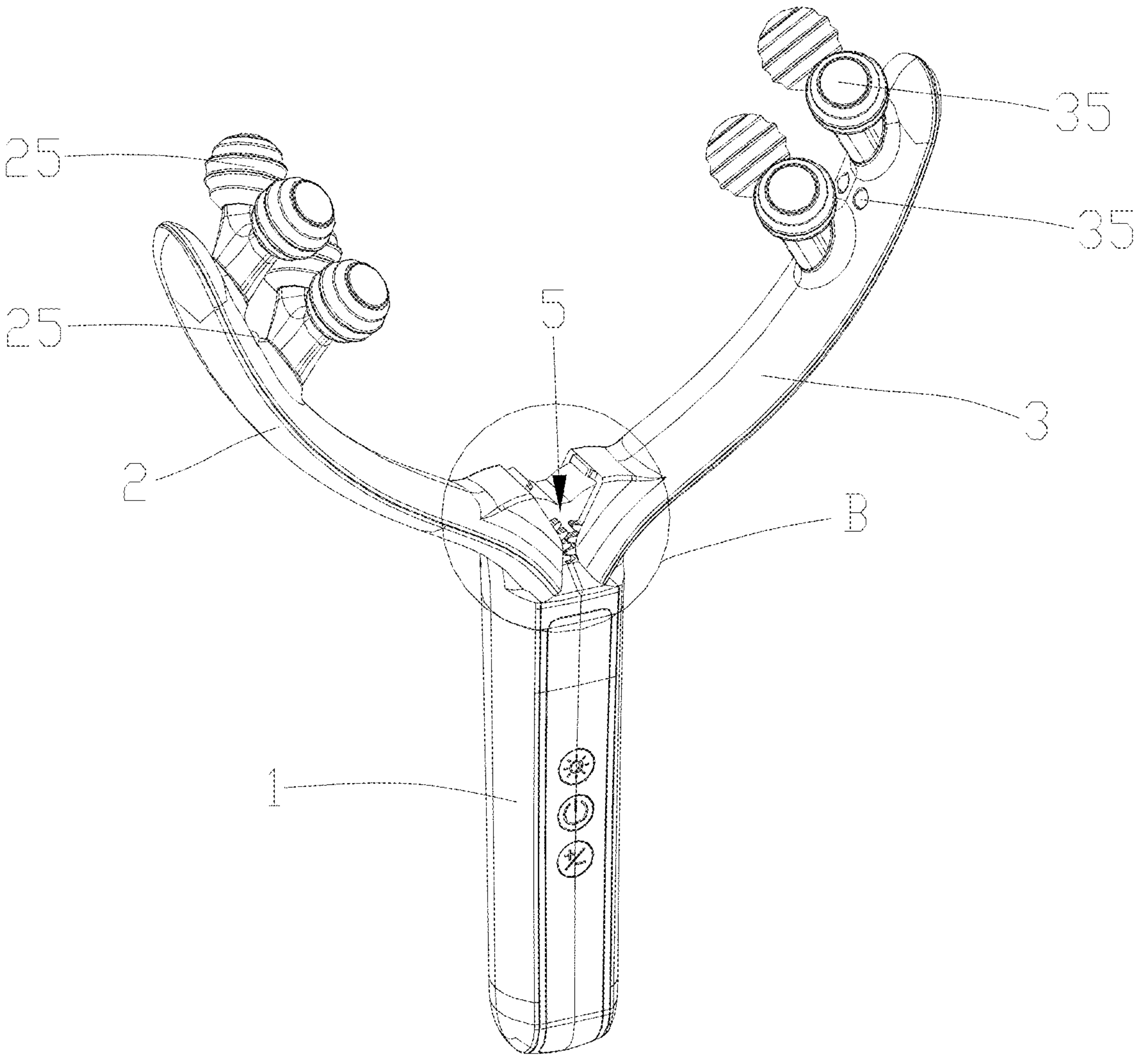
FIG. 2 is a structural view of the therapeutic apparatus according to some embodiments of the present disclosure, with a first therapeutic arm and a second therapeutic arm elastically opened relative to each other.
Figure 3:
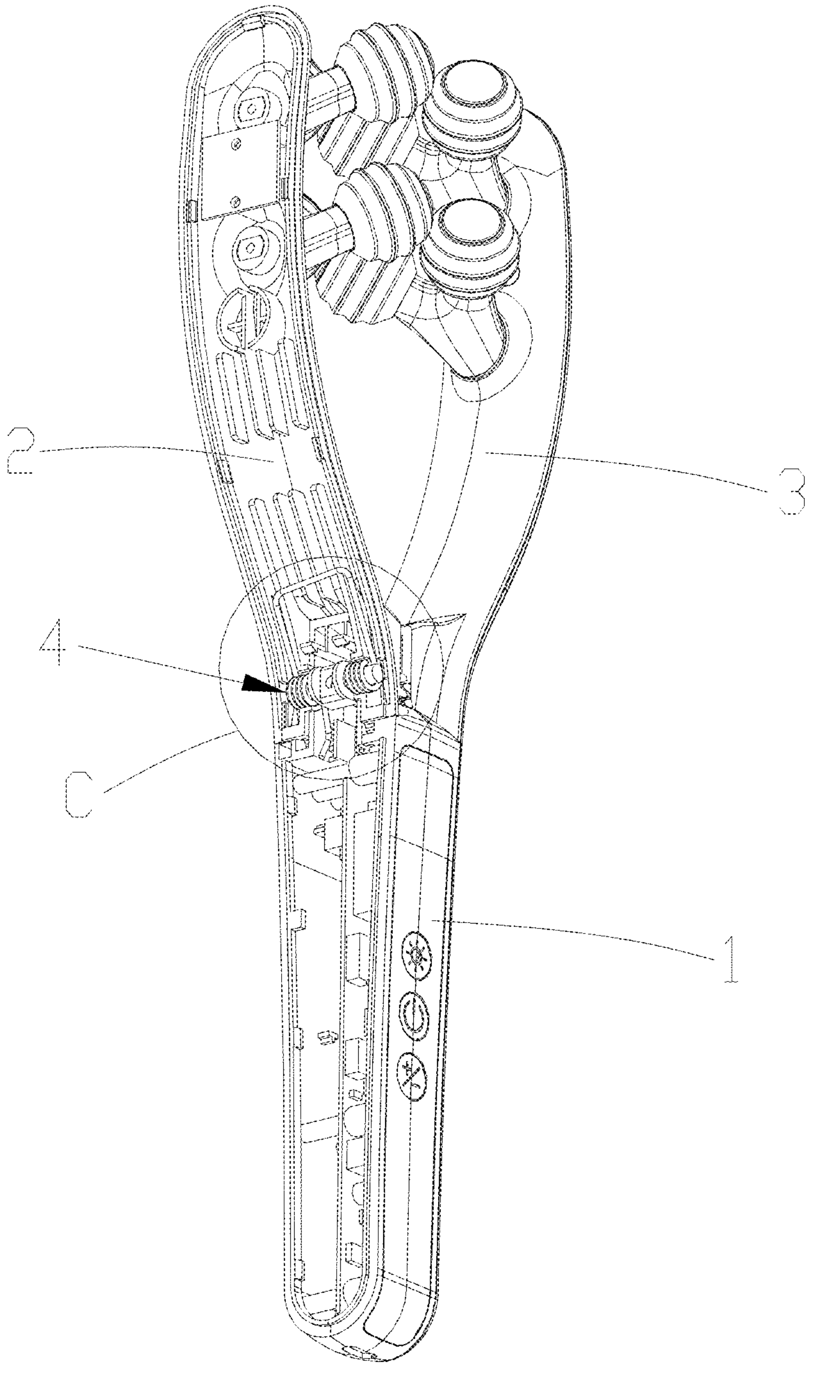
FIG. 3 is an assembly view of a first torsion spring according to some embodiments of the present disclosure, with a first housing of the first therapeutic arm and a first side cover of a handheld member omitted.
Figure 4:
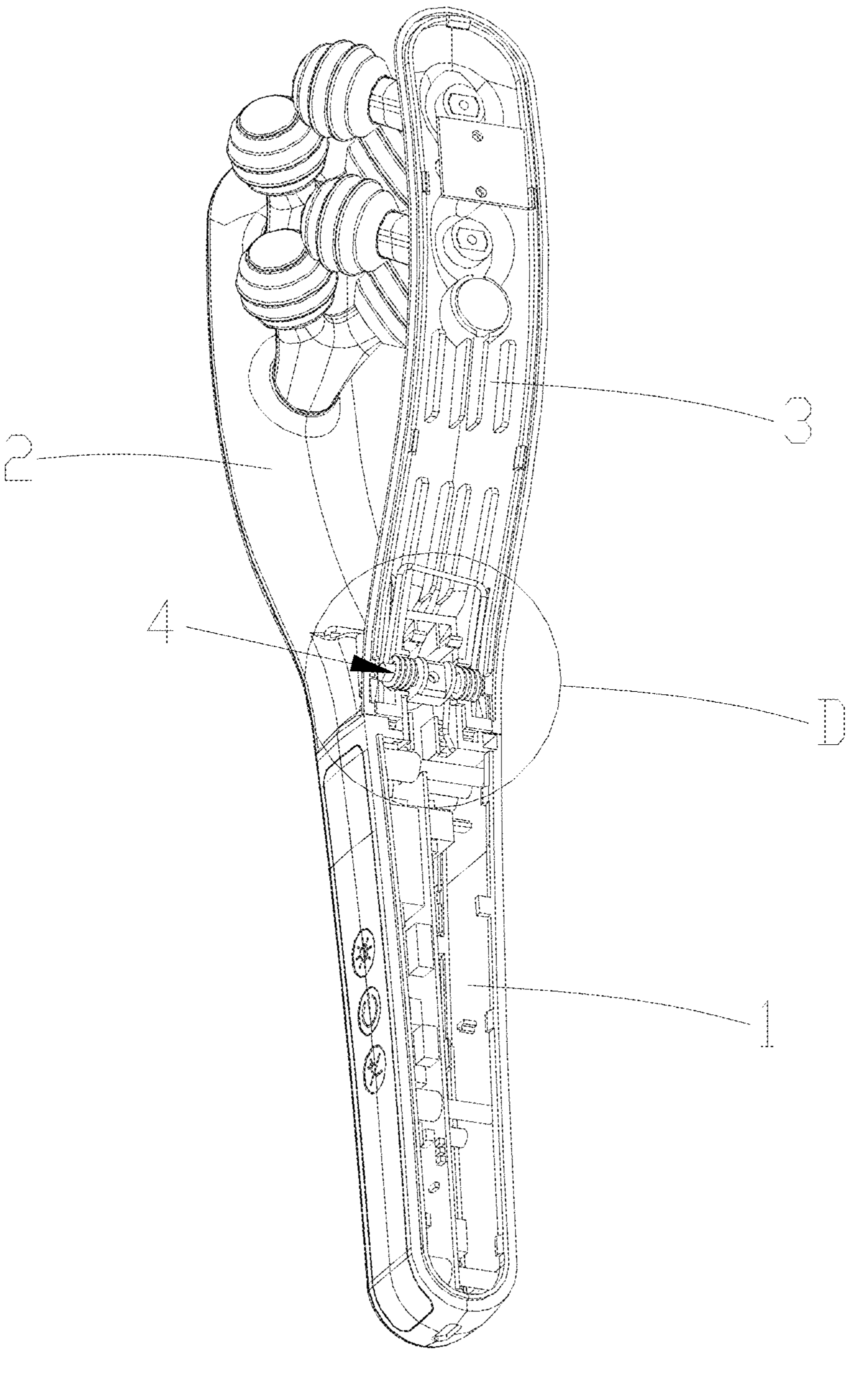
FIG. 4 is an assembly view of a second torsion spring according to some embodiments of the present disclosure, with a third housing of the second therapeutic arm and a second side cover of the handheld member omitted.
Figure 5:
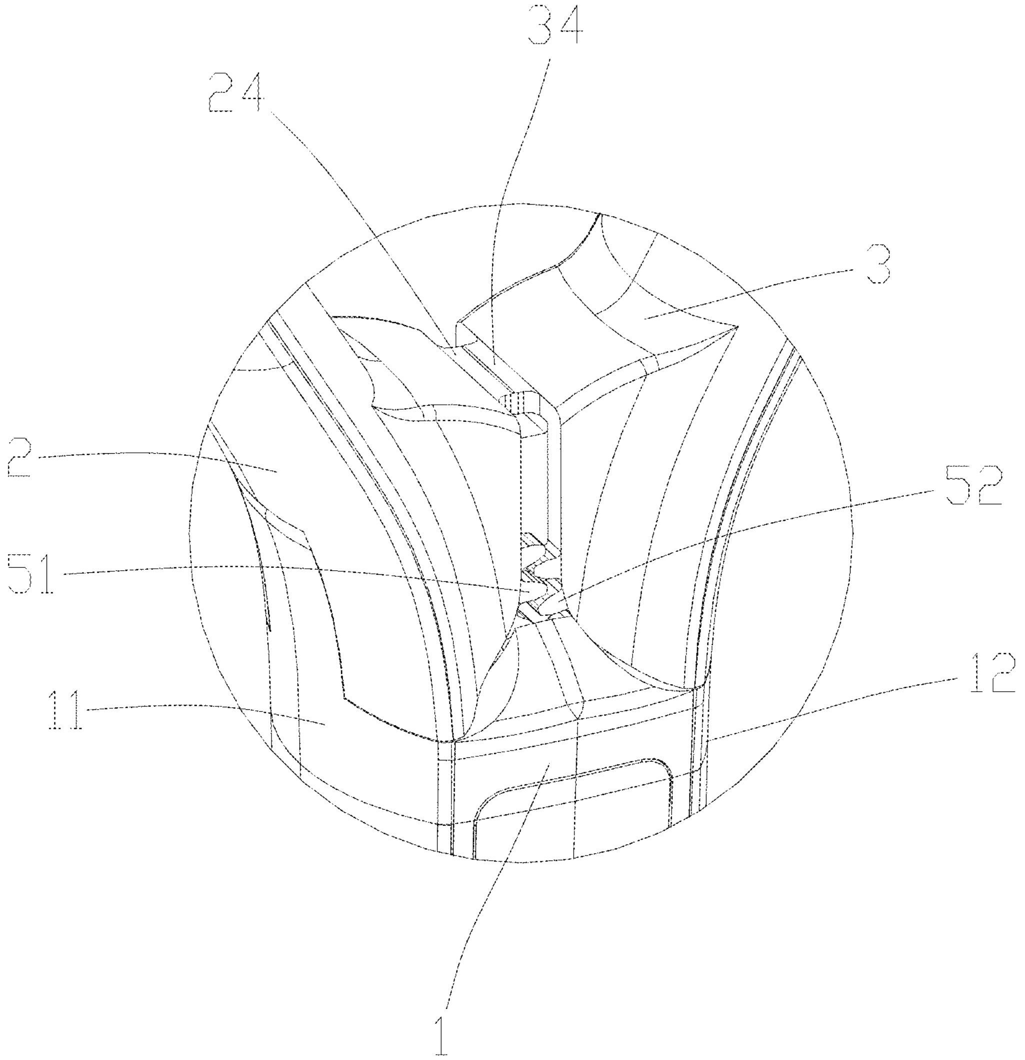
FIG. 5 is an enlarged view of a portion A in FIG. 1.
Figure 6:
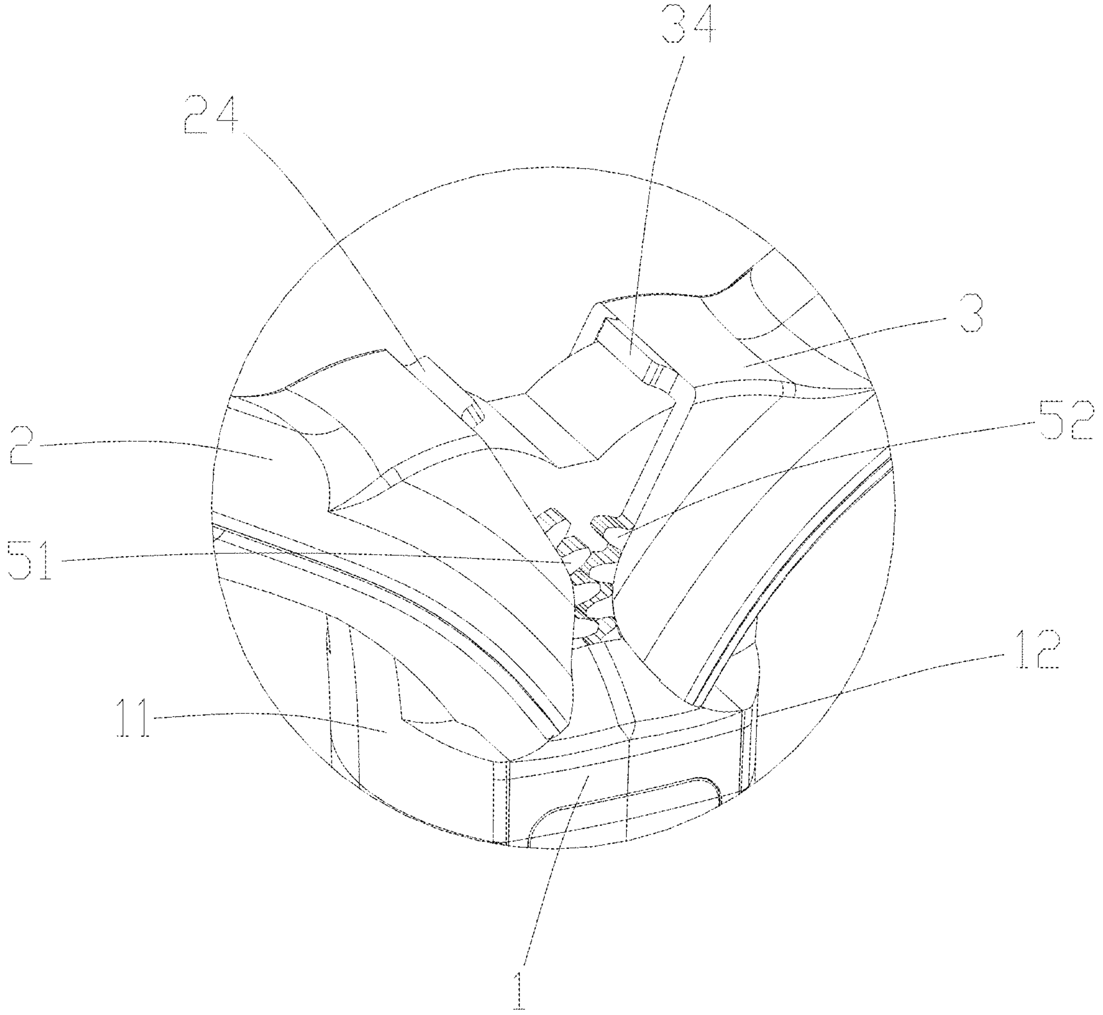
FIG. 6 is an enlarged view of a portion B in FIG. 2.
Figure 7:
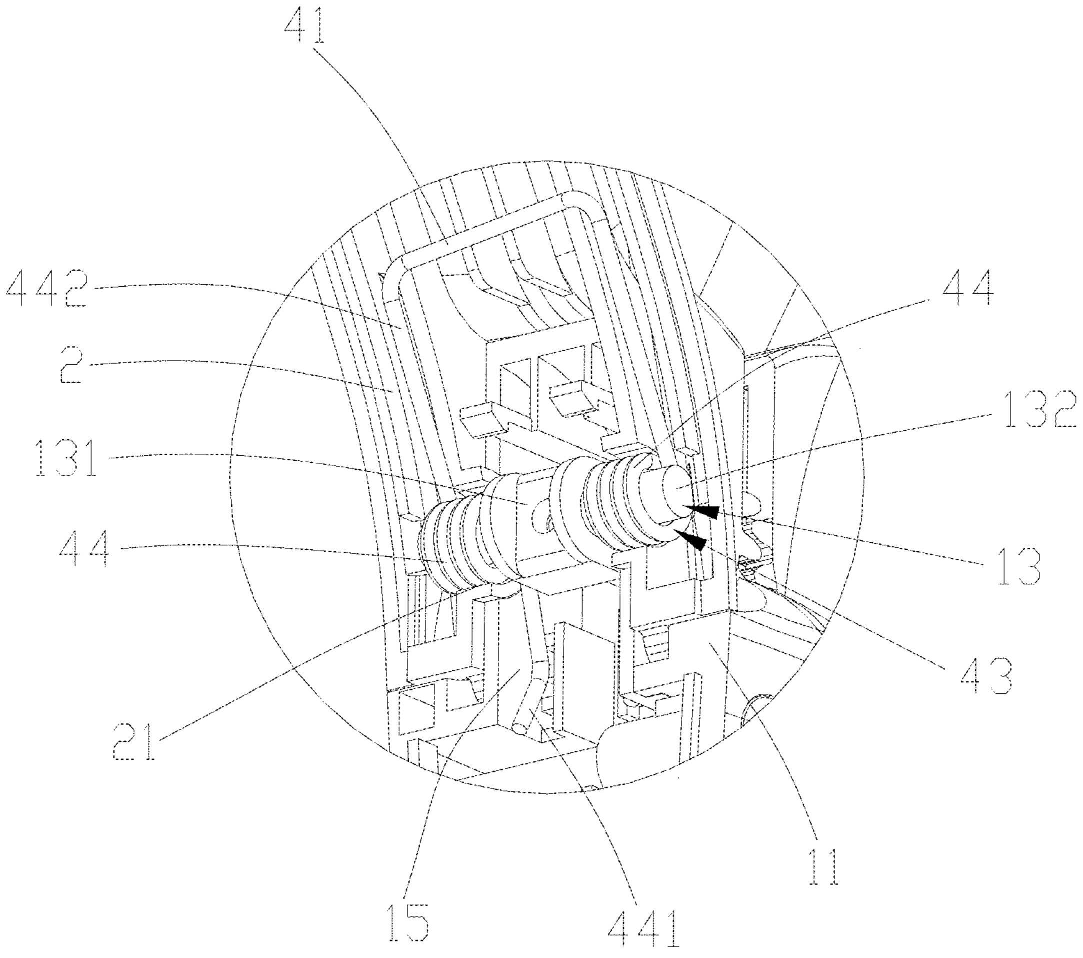
FIG. 7 is an enlarged view of a portion C in FIG. 3.
Figure 8:
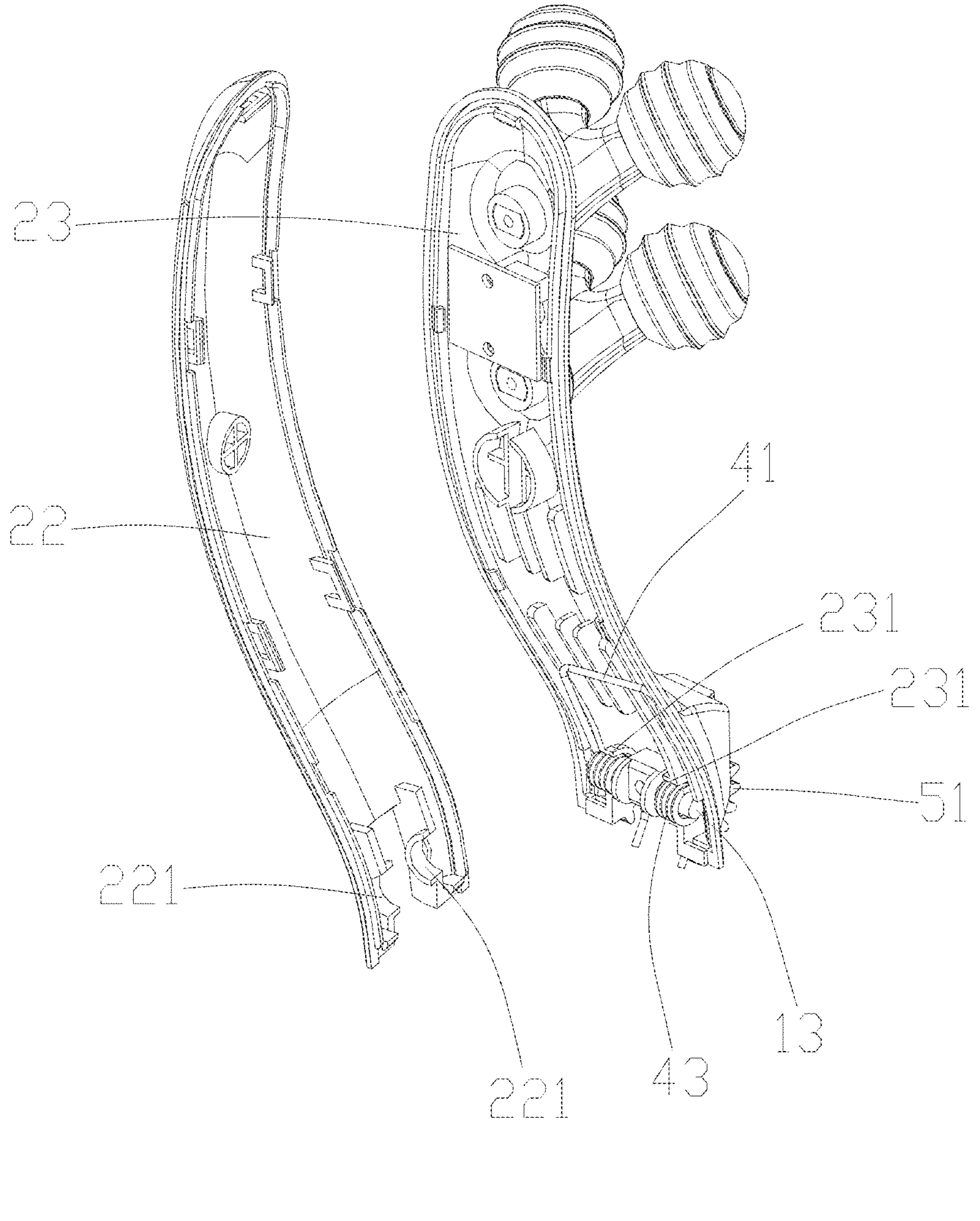
FIG. 8 is an assembly view of a first shaft hole according to some embodiments of the present disclosure.
Figure 9:
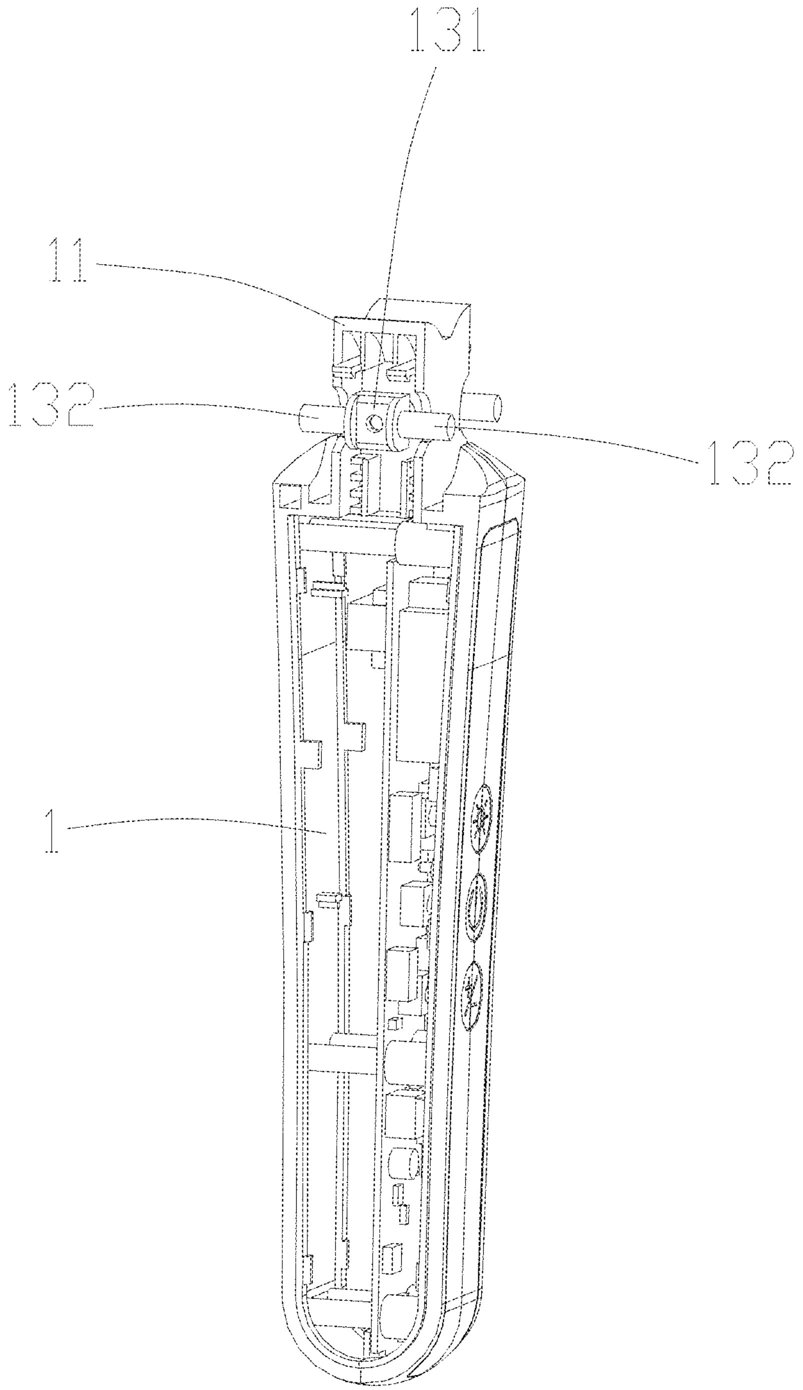
FIG. 9 is an assembly view of a first central shaft according to some embodiments of the present disclosure.
Figure 10:
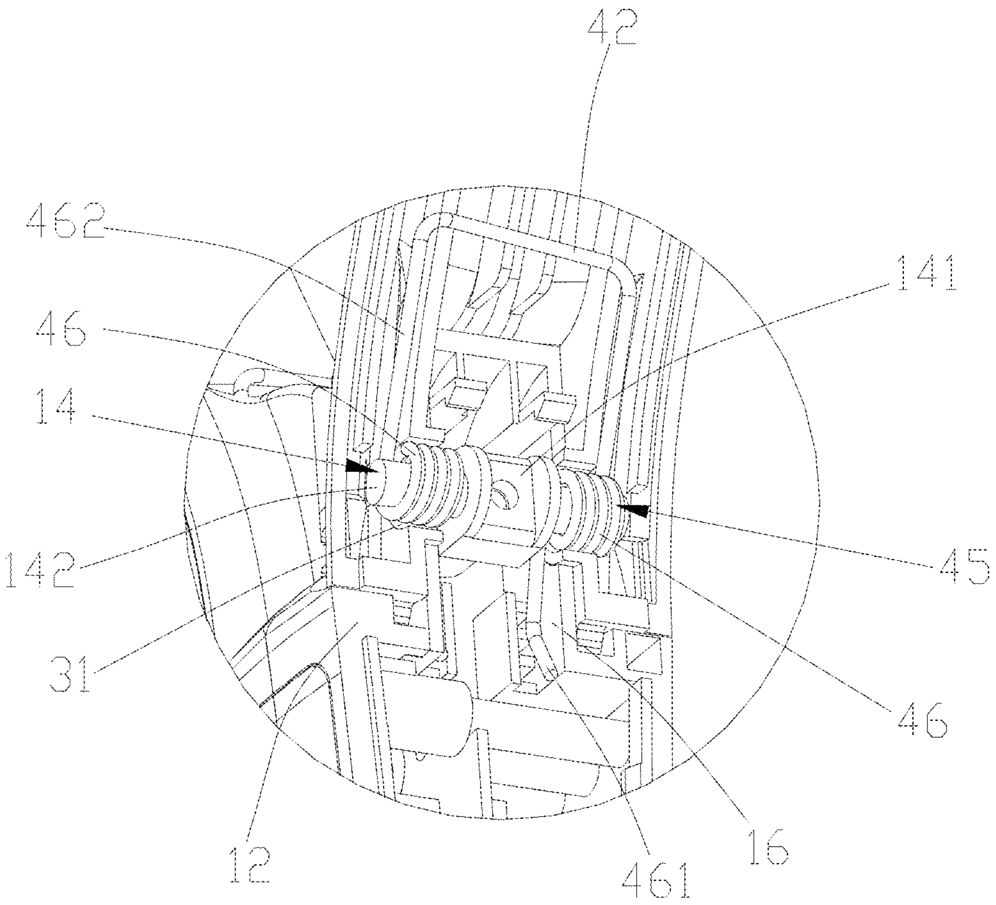
FIG. 10 is an enlarged view of a portion D in FIG. 4.
Figure 11:
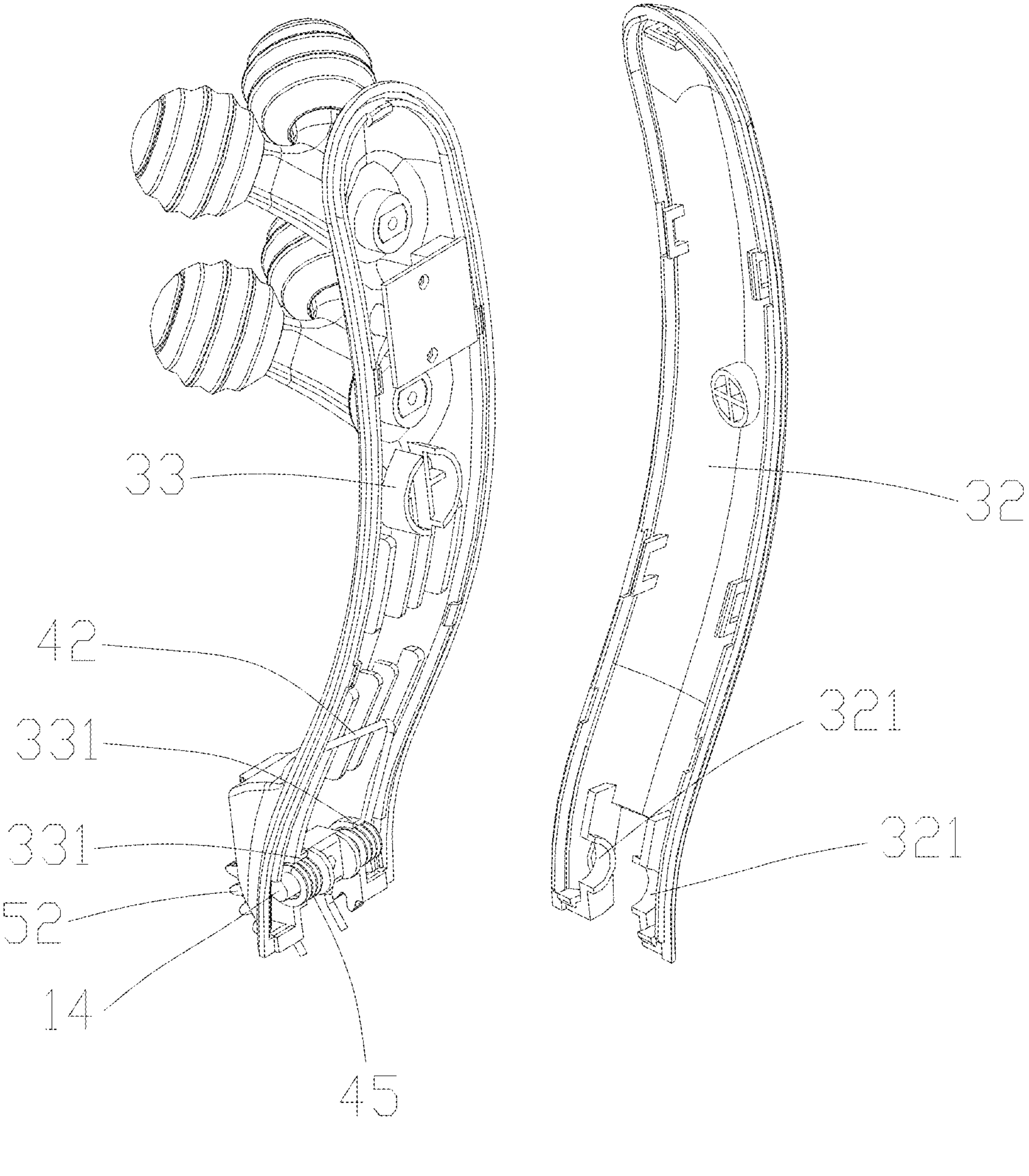
FIG. 11 is an assembly view of a second shaft hole according to some embodiments of the present disclosure.
Figure 12:
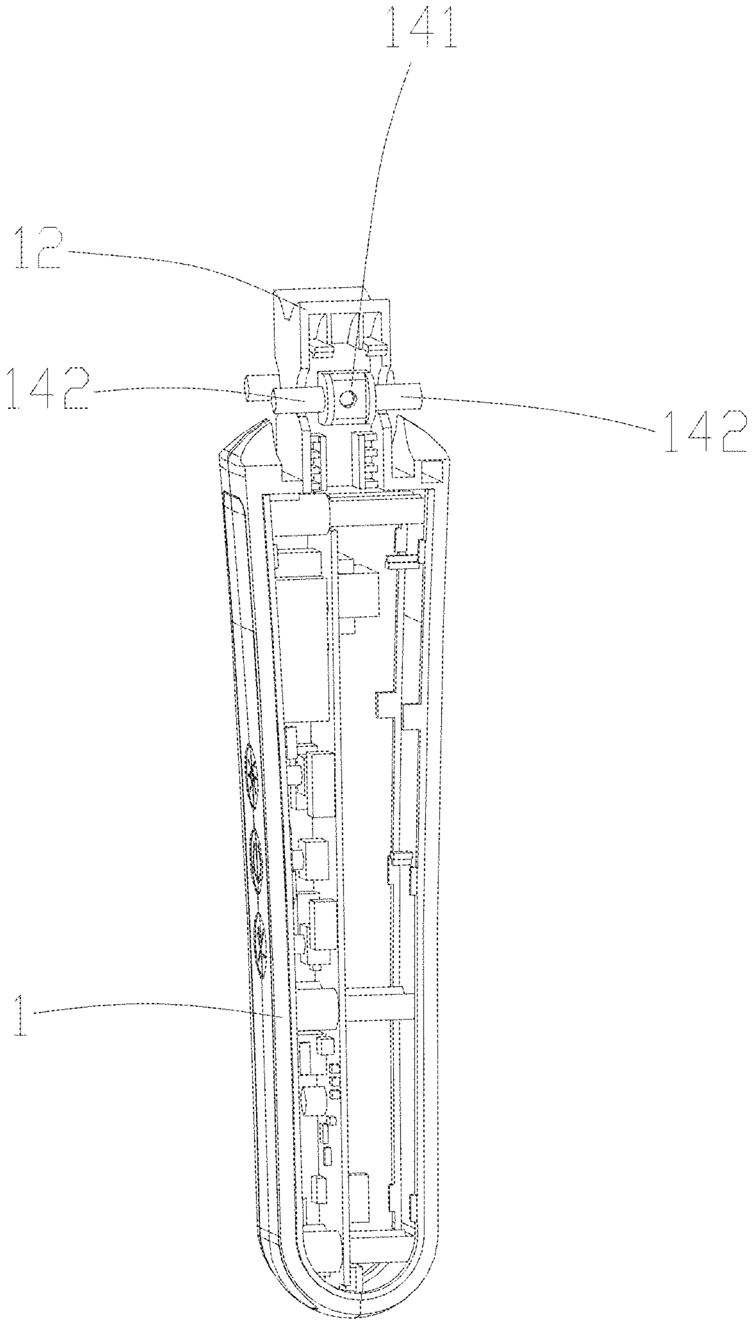
FIG. 12 is an assembly view of a second central shaft according to some embodiments of the present disclosure.

Referring to FIGS. 1-12, a therapeutic apparatus is provided. The therapeutic apparatus includes a handheld member 1, a first therapeutic arm 2, and a second therapeutic arm 3. The first therapeutic arm 2 and the second therapeutic arm 3 are arranged on the handheld member 1 and positioned facing each other. The first therapeutic arm 2 and the second therapeutic arm 3 are capable of elastically opening relative to each other. Thus, the first therapeutic arm 2 and the second therapeutic arm 3 can elastically clamp the therapeutic portion of the user for a therapy.

Due to the above-mentioned structural arrangement, the first therapeutic arm 2 and the second therapeutic arm 3 are capable of elastically opening relative to each other, providing a certain degree of mobility, the first therapeutic arm 2 and the second therapeutic arm 3 can elastically clamp the therapeutic portion of the user for the therapy. Specifically, the first therapeutic arm 2 and the second therapeutic arm 3 can clamp the therapeutic portion such as the user's face, legs, hands, etc. The structure of the therapeutic apparatus is simple, and the operation is flexible and convenient. Moreover, since the therapeutic apparatus includes the first therapeutic arm 2 and the second therapeutic arm 3, the first therapeutic arm 2 and the second therapeutic arm 3 can simultaneously provide the therapy, effectively improving efficiency and effect of the therapy.

In some embodiments, the therapeutic apparatus includes a torsion spring assembly 4. The torsion spring assembly 4 is configured to enable the first therapeutic arm 2 and the second therapeutic arm 3 to elastically open relative to each other.

Specifically, the torsion spring assembly 4 includes a first torsion spring 41 and a second torsion spring 42. The first torsion spring 41 is configured to enable the first therapeutic arm 2 to elastically open relative to the second torsion spring 42, and the second torsion spring 42 is configured to enable the second therapeutic arm 3 to elastically open relative to the first therapeutic arm 2. The structure of the therapeutic apparatus is simple and thus convenient for operation.

In some embodiments, the handheld member 1 has a first side 11 and a second side 12. One end of the first therapeutic arm 2 is rotatably connected to the first side 11 of the handheld member 1. One end of the first torsion spring 41 abuts against the first side 11 of the handheld member 1, and the other end of the first torsion spring 41 abuts against the one end of the first therapeutic arm 2. One end of the second therapeutic arm 3 is rotatably connected to the second side 12 of the handheld member 1. One end of the second torsion spring 42 abuts against the second side 12 of the handheld member 1, and the other end of the second torsion spring 42 abuts against the one end of the second therapeutic arm 3. In this way, the first therapeutic arm 2 and the second therapeutic arm 3 can rotate and open relative to each other. During a process of rotation and opening, the first therapeutic arm 2 can elastically compress the other end of the first torsion spring 41, and the second therapeutic arm 3 can elastically compress the other end of the second torsion spring 42, thereby achieving the elastic opening of the first therapeutic arm 2 and the second therapeutic arm 3 relative to each other. Furthermore, after the therapy is completed, the first torsion spring 41 can reset the first therapeutic arm 2, and the second torsion spring 42 can reset the second therapeutic arm 3. The first side 11 of the handheld member 1 defines a first limit groove 15. The one end of the first torsion spring 41 is arranged in the first limit groove 15 to limit the first torsion spring 41 from displacing. Similarly, the second side 12 of the handheld member 1 defines a second limit groove 16. The one end of the second torsion spring 42 is arranged in the second limit groove 16 to limit the second torsion spring 42 from displacing.

In some embodiments, the first side 11 of the handheld member 1 is arranged with a first central shaft 13. The first torsion spring 41 has a first central portion 43. The first central portion 43 sleeves the first central shaft 13. The one end of the first therapeutic arm 2 defines a first shaft hole 21. The one end of the first therapeutic arm 2 sleeves the first central portion 43 via the first shaft hole 21, enabling the one end of the first therapeutic arm 2 to be rotatably connected to the first side 11 of the handheld member 1. The assembly structure between the first therapeutic arm 2 and the handheld member 1 is simple, which is convenient for assembly.

Further, the first central shaft 13 includes a first mounting portion 131 and two first shaft portions 132. The first mounting portion 131 is located in the middle of the first central shaft 13. Each of the two first shaft portions 132 is arranged on a respective one side of two sides of the first mounting portion 131. The first mounting portion 131 is connected to the first side 11 of the handheld member 1. The first central portion 43 of the first torsion spring 41 has two first sleeve portions 44. Each of the two first sleeve portions 44 sleeves a respective one of the two first shaft portions 132. The one end of the first therapeutic arm 2 sleeves the two first sleeve portions 44 via the first shaft hole 21, thereby achieving an assembly among the first therapeutic arm 2, the first torsion spring 41, and the first central shaft 13. This assembly has a simple structure and a reasonable design. The first mounting portion 131 can be fixed on the first side 11 of the handheld member 1 by screws.

In some embodiments, the two first sleeve portions 44 have two first abutting feet 441 extending towards the first side 11 of the handheld member 1, and each of the two first sleeve portions has a respective one of two first abutting feet 441. The two first abutting feet 441 cooperatively form the one end of the first torsion spring 41. The two first sleeve portions 44 have two second abutting feet 442 extending towards the one end of the first therapeutic arm 2. Each of the two first sleeve portions 44 has a respective one of the two second abutting feet 442. The two second abutting feet 442 are connected with each other to cooperatively form the other end of the first torsion spring 41. The above-mentioned structural forms a configuration of the first torsion spring 41, enhancing structural stability of the first torsion spring 41.

In some embodiments, the first therapeutic arm 2 includes a first housing 22 and a second housing 23. The first housing 22 is arranged with two first half hole units 221, and the second housing 23 is arranged with two second half hole units 231. When the first housing 22 and the second housing 23 are spliced together, the two first half hole units 221 and the two second half hole units 231 cooperatively define the first shaft hole 21, and each of the two first half hole units 221 corresponds to a respective one of the two second half hole units 231. Specifically, the first housing 22 and the second housing 23 may be connected by snapping.

Specifically, the second side 12 of the handheld member 1 is arranged with a second central shaft 14. The second torsion spring 42 has a second central portion 45, and the second central portion 45 sleeves the second central shaft 14. The one end of the second therapeutic arm 3 defines a second shaft hole 31, and the one end of the second therapeutic arm 3 sleeves the second central portion 45 via the second shaft hole 31, thereby achieving that the one end of the second therapeutic arm 3 is rotatably connected to the second side 12 of the handheld member 1. The structure is simple structure, and the assembly is convenient. The assembly structure between the second therapeutic arm 3 and the handheld member 1 is simple, which is convenient for assembly.

In some embodiments, the second central shaft 14 includes a second mounting portion 141 and two second shaft portions 142. The second mounting portion 141 is located in the middle of the second central shaft 14. Each of the two second shaft portions 142 is arranged on a respective one side of two sides of the second mounting portion 141. The second mounting portion 141 is connected to the second side 12 of the handheld member 1. The second central portion 45 of the second torsion spring 42 has two second sleeve portions 46. Each of the two second sleeve portions 46 sleeves a respective one of the two second shaft portions 142. The one end of the second therapeutic arm 3 sleeves the two second sleeve portions 46 via the second shaft hole 31, realizing an assembly among the second therapeutic arm 3, the second torsion spring 42, and the second central shaft 14. This assembly has a simple structure and a reasonable design. The second mounting portion 141 may be fixed to the second side 12 of the handheld member 1 by screws.

In some embodiments, the two second sleeve portions 46 have two third abutting feet 461 extending towards the second side 12 of the handheld member 1. Each of the two second sleeve portions 46 has a respective one of the two third abutting feet 461. The two third abutting feet 461 cooperatively form the one end of the second torsion spring 42. The two second sleeve portions 46 have two fourth abutting feet 462 extending towards the one end of the second therapeutic arm 3. The two fourth abutting feet 462 are connected with each other to cooperatively form the other end of the second torsion spring 42. The above-mentioned structure forms a configuration of the second torsion spring 42, enhancing structural stability of the second torsion spring 42.

In some embodiments, the second therapeutic arm 3 includes a third housing 32 and a fourth housing 33. The third housing 32 is arranged with two third half hole units 321, and the fourth housing 33 is arranged with two fourth half hole units 331. When the third housing 32 and the fourth housing 33 are spliced together, the two third half hole units 321 and the two fourth half hole units 331 cooperatively define the second shaft hole 31, and each of the two third half hole units 321 corresponds to a respective one of the two fourth half hole units 331. Specifically, the third housing 32 and the fourth housing 33 may be connected with each other by snapping.

In some embodiments, the first therapeutic arm 2 is arranged with a first stop portion 24, and the first stop portion 24 is arranged facing the second therapeutic arm 3. The second therapeutic arm 3 is arranged with a second stop portion 34, and the second stop portion 34 is arranged facing the first therapeutic arm 2. When the first therapeutic arm 2 and the second therapeutic arm 3 are elastically reset, the first stop portion 24 and the second stop portion 34 abut against each other, thereby preventing mutual impact between the first therapeutic arm 2 and the second therapeutic arm 3, making product design more reliable and reasonable.

The therapeutic apparatus further includes a linkage mechanism 5. The linkage mechanism 5 is configured to enable the first therapeutic arm 2 and the second therapeutic arm 3 to elastically open synchronously, making therapeutic operation of the therapeutic apparatus more convenient.

Specifically, the linkage mechanism 5 includes a first gear 51 and a second gear 52. The first gear 51 is arranged at the one end of the first therapeutic arm 2, and the first gear 51 is coaxially arranged with a rotation center of the first therapeutic arm 2. The rotation center of the first therapeutic arm 2 is the first central shaft 13. The first gear 51 is arranged facing the second therapeutic arm 3. The second gear 52 is arranged at the one end of the second therapeutic arm 3, and the second gear 52 is coaxially arranged with a rotation center of the second therapeutic arm 3. The rotation center of the second therapeutic arm 3 is the second central shaft 14. The second gear 52 is arranged facing the first therapeutic arm 2. The first gear 51 and the second gear 52 are meshed with each other. When one of the first therapeutic arm 2 and the second therapeutic arm 3 rotates, through the first gear 51 and second gear 52 which are meshed with each other, the other of the first therapeutic arm 2 and the second therapeutic arm 3 can rotate synchronously, thus realizing a linkage between the first therapeutic arm 2 and the second therapeutic arm 3, which is convenient for the user's therapeutic operation. Specifically, each of the first gear 51 and the second gear 52 may be a sector gear. The first gear 51 and the second housing 23 are integrally formed as a one-piece structure, and the second gear 52 and the fourth housing 33 are integrally formed as a one-piece structure.

Specifically, the other end of the first therapeutic arm 2 is arranged with a first therapeutic component 25, and the other end of the second therapeutic arm 3 is arranged with a second therapeutic component 35. When the first therapeutic arm 2 and the second therapeutic arm 3 elastically open relative to each other, the first therapeutic component 25 and the second therapeutic component 35 can clamp the therapeutic portion of the user, thus realizing the therapy for the user.

In some embodiments, each of the first therapeutic component 25 and the second therapeutic component 35 includes at least a pressure therapeutic component, a light therapeutic component, an electrical stimulation therapeutic component, and a radio frequency therapeutic component. Specifically, the pressure therapeutic component may be a massage head, a massage roller, etc. The light therapeutic component may be a blue light lamp, a red light lamp, an ultraviolet light lamp, a tanning lamp, etc. The electrical stimulation therapeutic component may be an EMS therapeutic component, a TENS therapeutic component, etc. The radio frequency therapeutic component may be an electromagnetic wave therapeutic component, etc. In addition, the first therapeutic component 25 and the second therapeutic component 35 can also be other types of therapeutic components, which are not exhaustively listed here. Moreover, each of the above-mentioned pressure therapeutic component, light therapeutic component, electrical stimulation therapeutic component, and radio frequency therapeutic component can be operated and used independently, and can also be used in combination according to requirements.

In some embodiments, one side of the handheld member is arranged with a first side cover, and the other side of the handheld member is arranged with a second side cover. Moreover, a storage battery and a circuit board may be arranged in the handheld member 1. The storage battery supplies power to the massage head and the red light lamp through the circuit board. Moreover, a connecting wire may pass from the handheld member 1 through the one end of the first therapeutic arm 2, passing through the first housing 22 and the second housing 23 to the other end of the first therapeutic arm 2. Similarly, the connecting wire may also pass from the handheld member 1 to the one end of the second therapeutic arm 3, passing through the third housing 32 and the fourth housing 33 to the other end of the second therapeutic arm 3.

The above are one or more embodiments provided in combination with specific content, and it is not considered that the specific implementation of the present disclosure is only limited to these descriptions. Any approximation, similarity to the method, structure, etc. of the present disclosure, or making several technical deductions or replacements under the premise of the concept of the present disclosure should be regarded as the protection scope of the present disclosure.

What is claimed is:

1. A facial therapeutic apparatus, comprising a handheld member, a first therapeutic arm, and a second therapeutic arm, wherein the first therapeutic arm and the second therapeutic arm are arranged on the handheld member and positioned facing each other, the first therapeutic arm and the second therapeutic arm are capable of elastically opening relative to each other, and the first therapeutic arm and the second therapeutic arm are capable of elastically clamping a therapeutic portion of a user for a therapy;

wherein the therapeutic apparatus further comprises a torsion spring assembly, wherein the torsion spring assembly is configured to enable the first therapeutic arm and the second therapeutic arm to open relative to each other elastically to clamp a user's face wherein the torsion spring assembly comprises a first torsion spring, and the first torsion spring is configured to enable the first therapeutic arm to open relative to the second therapeutic arm elastically;

wherein the handheld member has a first side and a second side, one end of the first therapeutic arm is rotatably connected to the first side of the handheld member, one end of the first torsion spring abuts against the first side of the handheld member, and another end of the first torsion spring abuts against the one end of the first therapeutic arm;

wherein the first side of the handheld member is arranged with a first central shaft, the first torsion spring has a first central portion, and the first central portion sleeves the first central shaft;

wherein the one end of the first therapeutic arm defines a first shaft hole, the one end of the first therapeutic arm sleeves the first central portion via the first shaft hole, and the one end of the first therapeutic arm is rotatably connected to the first side of the handheld member;

wherein the first central shaft comprises a first mounting portion and two first shaft portions, the first mounting portion is located in a middle of the first central shaft, each of the two first shaft portions is arranged on a respective one side of two sides of the first mounting portion, and the first mounting portion is connected to the first side of the handheld member.

2. The facial therapeutic apparatus as claimed in claim 1, wherein the torsion spring assembly comprises a second torsion spring, and the second torsion spring is configured to enable the second therapeutic arm to open relative to the first therapeutic arm elastically.

3. The facial therapeutic apparatus as claimed in claim 2, wherein one end of the second therapeutic arm is rotatably connected to the second side of the handheld member, one end of the second torsion spring abuts against the second side of the handheld member, and another end of the second torsion spring abuts against the one end of the second therapeutic arm.

4. The facial therapeutic apparatus as claimed in claim 3, wherein the second side of the handheld member is arranged with a second central shaft, the second torsion spring has a second central portion, and the second central portion sleeves the second central shaft;

the one end of the second therapeutic arm defines a second shaft hole, the one end of the second therapeutic arm sleeves the second central portion via the second shaft hole, and the one end of the second therapeutic arm is rotatably connected to the second side of the handheld member.

5. The facial therapeutic apparatus as claimed in claim 4, wherein the second central shaft comprises a second mounting portion and two second shaft portions, the second mounting portion is located in a middle of the second central shaft, each of the two second shaft portions is arranged on a respective one side of two sides of the second mounting portion, and the second mounting portion is connected to the second side of the handheld member;

the second central portion of the second torsion spring has two second sleeve portions, each of the two second sleeve portions sleeves a respective one of the two second shaft portions, and the one end of the second therapeutic arm sleeves the two second sleeve portions via the second shaft hole.

6. The facial therapeutic apparatus as claimed in claim 5, wherein the two second sleeve portions have two third abutting feet extending towards the second side of the handheld member, each of the two second sleeve portions has a respective one of the two third abutting feet, and the two third abutting feet cooperatively form the one end of the second torsion spring;

the two second sleeve portions have two fourth abutting feet extending towards the one end of the second therapeutic arm, and the two fourth abutting feet are connected with each other and cooperatively form the other end of the second torsion spring.

7. The facial therapeutic apparatus as claimed in claim 4, wherein the second therapeutic arm comprises a third housing and a fourth housing, the third housing is arranged with two third half hole units, and the fourth housing is arranged with two fourth half hole units;

when the third housing and the fourth housing are spliced together, the two third half hole units and the two fourth half hole units cooperatively define the second shaft hole, and each of the two third half hole units corresponds to a respective one of the two fourth half hole units.

8. The facial therapeutic apparatus as claimed in claim 3, wherein the first therapeutic arm is arranged with a first stop portion, and the first stop portion is arranged facing the second therapeutic arm; the second therapeutic arm is arranged with a second stop portion, and the second stop portion is arranged facing the first therapeutic arm;

when the first therapeutic arm and the second therapeutic arm are elastically reset, the first stop portion and the second stop portion abut against each other.

9. The facial therapeutic apparatus as claimed in claim 3, further comprising a linkage assembly, wherein the linkage assembly is configured to enable the first therapeutic arm and the second therapeutic arm to elastically open synchronously.

10. The facial therapeutic apparatus as claimed in claim 9, the linkage assembly comprises a first gear and a second gear, the first gear is arranged at the one end of the first therapeutic arm, the first gear is coaxially arranged with a rotation center of the first therapeutic arm, and the first gear is arranged facing the second therapeutic arm;

the second gear is arranged at the one end of the second therapeutic arm, the second gear is coaxially arranged with a rotation center of the second therapeutic arm, the second gear is arranged facing the first therapeutic arm, and the first gear and the second gear are meshed with each other.

11. The facial therapeutic apparatus as claimed in claim 3, another end of the first therapeutic arm is arranged with a first therapeutic piece, and another end of the second therapeutic arm is arranged with a second therapeutic piece;

when the first therapeutic arm and the second therapeutic arm elastically open relative to each other, the first therapeutic piece and the second therapeutic piece are capable of clamping the therapeutic portion of the user.

12. The facial therapeutic apparatus as claimed in claim 11, each of the first therapeutic piece and the second therapeutic piece comprises at least a pressure therapeutic piece, a light therapeutic piece, an electrical stimulation therapeutic piece, and a radio frequency therapeutic piece.

13. The facial therapeutic apparatus as claimed in claim 1, wherein the first central portion of the first torsion spring has two first sleeve portions, each of the two first sleeve portions sleeves a respective one of the two first shaft portions, and the one end of the first therapeutic arm sleeves the two first sleeve portions via the first shaft hole; the two first sleeve portions have two first abutting feet extending towards the first side of the handheld member, each of the two first sleeve portions has a respective one of the two first abutting feet, and the two first abutting feet cooperatively form the one end of the first torsion spring;

the two first sleeve portions have two second abutting feet extending towards the one end of the first therapeutic arm, and each of two first sleeve portions has a respective one of the two second abutting feet, and the two second abutting feet are connected to each other and cooperatively form the other end of the first torsion spring.

14. The facial therapeutic apparatus as claimed in claim 1, wherein the first therapeutic arm comprises a first housing and a second housing, the first housing is arranged with two first half hole units, and the second housing is arranged with two second half hole units;

when the first housing and the second housing are spliced together, the two first half hole units and the two second half hole units cooperatively define the first shaft hole, and each of the two first half hole units corresponds to a respective one of the two second half hole units.

15. A facial therapeutic apparatus, comprising a handheld member, a first therapeutic arm, and a second therapeutic arm, wherein the first therapeutic arm and the second therapeutic arm are arranged on the handheld member and positioned facing each other, the first therapeutic arm and the second therapeutic arm are capable of opening relative to each other elastically, and the first therapeutic arm and the second therapeutic arm are capable of elastically clamping a therapeutic portion of a user for a therapy;

wherein the therapeutic apparatus further comprises a linkage assembly, the linkage assembly is configured to enable the first therapeutic arm and the second therapeutic arm to elastically open synchronously;

wherein the therapeutic apparatus further comprises a torsion spring assembly, wherein the torsion spring assembly is configured to enable the first therapeutic arm and the second therapeutic arm to open relative to each other elastically to clamp a user's face wherein the first therapeutic arm comprises a first housing and a second housing, the first housing is arranged with two first half hole units, and the second housing is arranged with two second half hole units;

when the first housing and the second housing are spliced together, the two first half hole units and the two second half hole units cooperatively define a first shaft hole, and each of the two first half hole units corresponds to a respective one of the two second half hole units.

16. The facial therapeutic apparatus as claimed in claim 15, the handheld member has a first side and a second side, one end of the first therapeutic arm is rotatably connected to the first side of the handheld member, and another end of the first therapeutic arm is arranged with a first therapeutic piece; one end of the second therapeutic arm is rotatably connected to the second side of the handheld member, and another end of the second therapeutic arm is arranged with a second therapeutic piece.

17. The facial therapeutic apparatus as claimed in claim 16, the linkage assembly comprises a first gear and a second gear, the first gear is arranged at the one end of the first therapeutic arm, the first gear is coaxially arranged with a rotation center of the first therapeutic arm, and the first gear is arranged facing the second therapeutic arm;

the second gear is arranged at the one end of the second therapeutic arm, the second gear is coaxially arranged with a rotation center of the second therapeutic arm, the second gear is arranged facing the first therapeutic arm, and the first gear and the second gear are meshed with each other.

18. A facial therapeutic apparatus, comprising a handheld member, a first therapeutic arm, and a second therapeutic arm, wherein the first therapeutic arm and the second therapeutic arm are arranged on the handheld member and positioned facing each other, the first therapeutic arm and the second therapeutic arm are capable of elastically opening relative to each other, and the first therapeutic arm and the second therapeutic arm are capable of elastically clamping a therapeutic portion of a user for a therapy;

wherein the therapeutic apparatus further comprises a torsion spring assembly, wherein the torsion spring assembly is configured to enable the first therapeutic arm and the second therapeutic arm to open relative to each other elastically to clamp a user's face;

wherein the first therapeutic arm comprises a first housing and a second housing, the first housing is arranged with two first half hole units, and the second housing is arranged with two second half hole units;

when the first housing and the second housing are spliced together, the two first half hole units and the two second half hole units cooperatively define a first shaft hole, and each of the two first half hole units corresponds to a respective one of the two second half hole units.

* * * * *